United States Patent
Peacock

(10) Patent No.: US 9,286,862 B2
(45) Date of Patent: Mar. 15, 2016

(54) SYSTEM AND METHOD FOR DETECTING A SCROLLING EVENT DURING A CLIENT DISPLAY UPDATE

(75) Inventor: John Kent Peacock, Menlo Park, CA (US)

(73) Assignee: Oracle International Corporation, Redwood City, CA (US)

( * ) Notice: Subject to any disclaimer, the term of this patent is extended or adjusted under 35 U.S.C. 154(b) by 115 days.

(21) Appl. No.: 13/442,438

(22) Filed: Apr. 9, 2012

(65) Prior Publication Data

US 2013/0265335 A1 Oct. 10, 2013

(51) Int. Cl.
G09G 5/32 (2006.01)
G09G 5/34 (2006.01)
G06F 3/14 (2006.01)

(52) U.S. Cl.
CPC .............. *G09G 5/34* (2013.01); *G06F 3/1462* (2013.01); *G09G 2370/022* (2013.01); *G09G 2370/042* (2013.01)

(58) Field of Classification Search
None
See application file for complete search history.

(56) References Cited

U.S. PATENT DOCUMENTS

| | | | |
|---|---|---|---|
| 8,644,620 B1* | 2/2014 | Lam | 382/209 |
| 8,787,460 B1* | 7/2014 | Hobbs | 375/240.16 |
| 2009/0083512 A1* | 3/2009 | Godwin et al. | 711/173 |
| 2011/0002550 A1* | 1/2011 | Takada | 382/218 |
| 2011/0299785 A1* | 12/2011 | Albu et al. | 382/209 |

OTHER PUBLICATIONS

Hash table, (Wikipedia, "https://web.archive.org/web/20110309071409/http://en.wikipedia.org/wiki/Hash_table", dated Mar. 9, 2011 by wayback machine.*
http://www.brianmadden.com/blogs/brianmadden/archive/2007/11/05/remote-display-prot . . . , "Remote display protocols for VDI: will RDP be enough?", Nov. 5, 2007, 8 pages.
http://www.brianmadden.com/blogs/gabeknuth/archive/2010/04/08/PC_2D00_over_2D00 . . . , "PC-over-IP email interview with VMware's Warren Ponder and Teradici's Randy Groves", Aug. 8, 2010, 4 pages.
http://en.wikipedia.org/wiki/LZ77_and_LZ78, "LZ77 and LZ78", Apr. 8, 2012, 5 pages.
Christiansen et al., "Fast Motion Detection for Thin Client Compression", Department of Computer Science, University of California, IEEE Computer Society, 2002, 10 pages.

* cited by examiner

*Primary Examiner* — Tize Ma
*Assistant Examiner* — Yu Chen
(74) *Attorney, Agent, or Firm* — Brooks Kushman P.C.

(57) ABSTRACT

An apparatus including a first computer for detecting a scrolling event is provided. The first computer is configured to store a destination array including pixels corresponding to a present set of data for a second computer and to store a source array including pixels corresponding to an expected set of data for a display on the second computer after a scrolling event. The first computer is configured to determine hash values of pixel pairs for the pixels of the destination array and to determine hash values of pixel pairs for the pixels of the source array. The first computer is configured to determine a final scroll offset between the pixels in the destination array and the source array based on the hash values. The first computer is configured to transmit pixels indicative of the expected set of data to the second computer based on the final scroll offset for display.

17 Claims, 7 Drawing Sheets

```
1    Parameters: MAXLOOK=1, HASHSIZE=32  W=4  H=4
2
3    Destination (Dst):
4
5       0  1  2  3
6
7    0  *  B  C  D
8    1  E  F  G  H        ←—180
9    2  I  J  K  L
10   3  M  N  O  P
11
12   Source (Src):
13
14      0  1  2  3
15
16   0  *                 ←—182
17   1     A  B  C
18   2     E  F  G
19   3     I  J  K
20
21   Destination Hash Values:
22
23      0  1  2  3
24
25   0  12  5  7
26   1  11 13 15          ←— 184
27   2  19 21 23
28   3  27 29 31
29
30   Hash Bucket Locations ('*' Means 1 < Count <= MAXLOOK )
31          Count
32
33      0   0
34      1   0
35      2   0
36      3   0
37      4   0
38   *  5   1      1, 0
39      6   0
40   *  7   1      2, 0
41      8   0
42      9   0
43     10   0
44   * 11   1      0, 1
45   * 12   1      0, 0
46   * 13   1      1, 1    ←—188
47     14   0
48   * 15   1      2, 1
49     16   0
50     17   0
51     18   0
52   * 19   1      0, 2
53     20   0
54   * 21   1      1, 2
55     22   0
```

Fig-3A

```
56    * 23  1    2, 2
57      24  0
58      25  0
59      26  0
60    * 27  1    0, 3
61      28  0
62    * 29  1    1, 3
63      30  0
64    * 31  1    2, 3
65
66   Source Hash Values :
67
68       0  1   2   3
69
70   0  10  0   0          ◄──── 189
71   1   1  3   5
72   2   5 11  13
73   3   9 19  21
74
75   Source Hash/Compare :
76
77   Compare Hash=5 Src 2, 1 "BC" to Dst 1, 0 "BC" Offset 1, 1 no Match
78        Compared Src Row 1, Columns 1 to 3 Against Dst Row 0, Columns 0 to 2
79
80   Compare Hash=5 Src 0, 2 "E" to Dst 1, 0 "BC" Offset -1, 2 no Match
81        Compared Src Row 2, Columns 0 to 2 Against Dst Row 0, Columns 1 to 3
82
83   Compare Hash=11 Src 1, 2 "EF" to Dst 0, 1 "EF" Offset 1, 1 Line Matches
84        Compared Src Row 1, Columns 1 to 3 Against Dst Row 0, Columns 0 to 2  ◄──── 190
85
86   Compare Hash=19 Src 1, 3 "IJ" to Dst 0, 2 "IJ" Offset 1, 1 Line Matches
87        Compared Src Row 3, Columns 1 to 3 Against Dst Row 2, Columns 0 to 2  ◄──── 192
88
89
90   Remembered Offsets :
91
92   1, 1 Occurred 2 Times       ◄──── 194
93
94   Return : Cols=1 Rows=1
95
96   Offset Comparison Src - Dst, Offset = 1, 1
97
98   Row 0
99        Cols 0-4 MustFill      ◄──── 196
100  Row 1
101      Col 0 MustFill
102      Col 1 Compare Dst 0, 0 "*" Against Src 1, 1 "A" CantCopy
103      Col 2 Compare Dst 1, 0 "B" Against Src 2, 1 "B" Equal
104      Col 3 Compare Dst 2, 0 "C" Against Src 3, 1 "C" Equal
105  Row 2
106      Col 0 MustFill                                                          } 200
107      Col 1 Compare Dst 0, 1 "E" Against Src 1, 2 "E" Equal
108      Col 2 Compare Dst 1, 1 "F" Against Src 2, 2 "F" Equal
109      Col 3 Compare Dst 2, 1 "G" Against Src 3, 2 "G" Equal
110  Row 3
```

*Fig-3B*

```
111     Col 0 MustFill
112     Col 1 Compare Dst 0, 2 "I" Against Src 1, 3 "I" Equal
113     Col 2 Compare Dst 1, 2 "J" Against Src 2, 3 "J" Equal
114     Col 3 Compare Dst 2, 2 "K" Against Src 3, 3 "K" Equal
115
116  Comparison Results: C = Can Copy, M = Must Fill, N = no Copy
117
118     0  1  2  3
119
120  0  M  M  M  M      ←—198
121  1  M  N  C  C
122  2  M  C  C  C
123  3  M  C  C  C
124
125  CantCopyCount = 1 of 9 Entries.   ←—202
126
127  Now do Compare with no Offset:
128
129  Row 0
130     Col 0 Compare Dst "*" Against Src "*" Equal
131     Col 1 Compare Dst "B" Against Src " " Dirty
132     Col 2 Compare Dst "C" Against Src " " Dirty   ←—206
133     Col 3 Compare Dst "D" Against Src " " Dirty
134  Row 1
135     Col 0 Compare Dst "E" Against Src " " Dirty   ←—206
136     Col 1 Compare Dst "F" Against Src "A" Dirty
137     Col 2 Compare Dst "G" Against Src "B" Copy
138     Col 3 Compare Dst "H" Against Src "C" Copy    ←—210
139  Row 2
140     Col 0 Compare Dst "I" Against Src " " Dirty   ←—206
141     Col 1 Compare Dst "J" Against Src "E" Copy
142     Col 2 Compare Dst "K" Against Src "F" Copy    ←—210
143     Col 3 Compare Dst "L" Against Src "G" Copy
144  Row 3
145     Col 0 Compare Dst "M" Against Src " " Dirty   ←—206
146     Col 1 Compare Dst "N" Against Src "I" Copy
147     Col 2 Compare Dst "O" Against Src "J" Copy    ←—210
148     Col 3 Compare Dst "P" Against Src "K" Copy
149
150  Update Matrix: C = Dst to Dst Copy, S = Copy from Src, E = no Change:
151
152     0  1  2  3              0  1  2  3
153
154  0  E  D  D  D           0  *
155  1  D  D  C  C           1     A  B  C     ←—208
156  2  D  C  C  C           2     E  F  G
157  3  D  C  C  C           3     I  J  K
158
159  Costs Assuming Dst-Dst Copy Cost is 1 and Src-Dst Copy Cost is 10:
160     Without Invention:       160    ←—212
161     With Invention:           78
162
163  Savings: 52%
```

*Fig-3C*

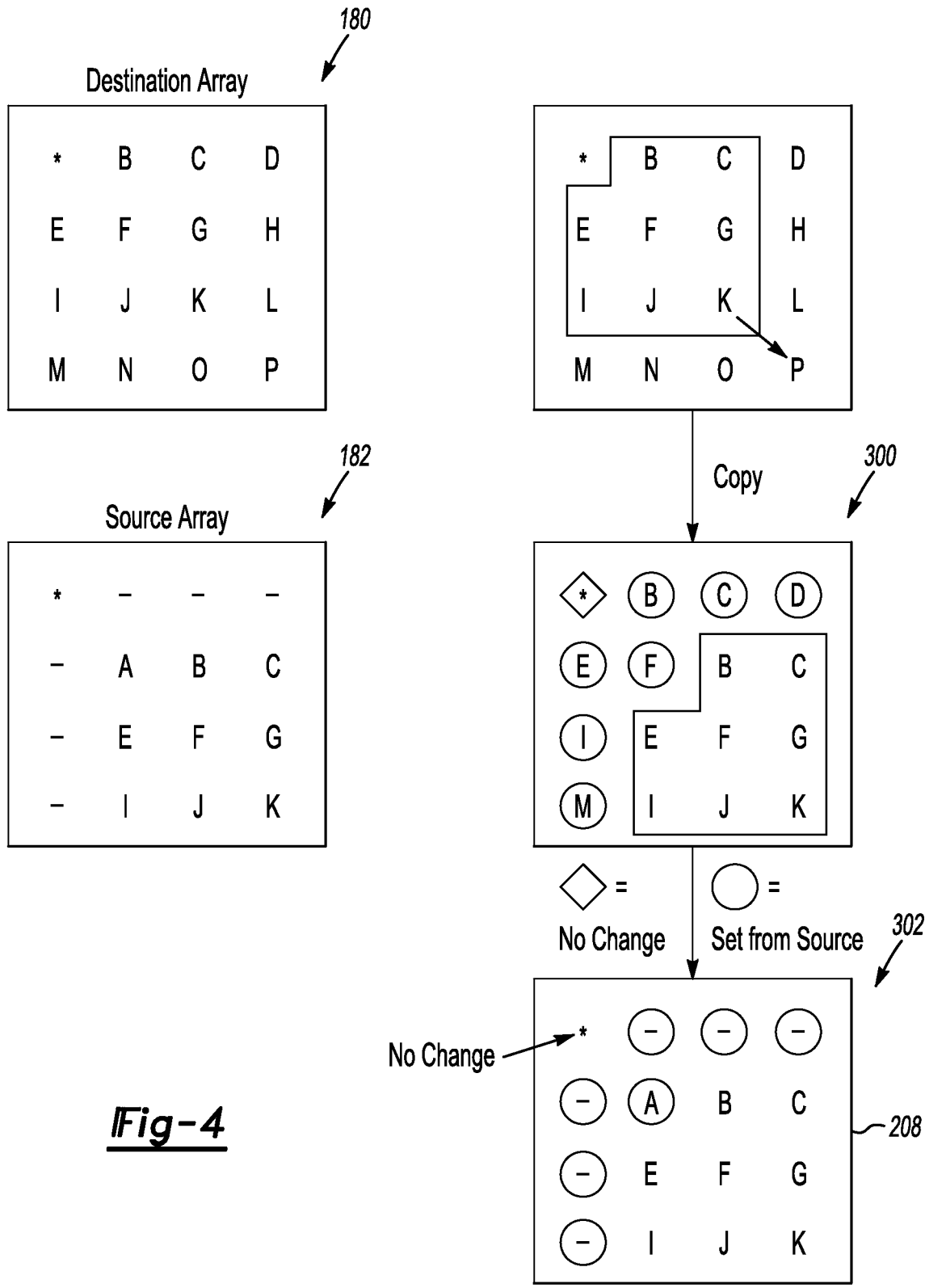

SYSTEM AND METHOD FOR DETECTING A SCROLLING EVENT DURING A CLIENT DISPLAY UPDATE

TECHNICAL FIELD

Embodiments of the present disclosure generally relate to a system and method for detecting a scrolling event during a client display update.

BACKGROUND

Thin clients are generally defined as clients that perform little or no local data processing. Such thin clients may rely on central computer such as a server to execute applications. The clients and the server are coupled to one another via a network. The server generally provides audio and video data over the network to the thin client (e.g., a desktop device). The desktop device may play back the audio data or display the video data as such data is received from the server.

In, for example, a Sun Ray® thin client product, video rendering may be done largely through the use of server graphics virtualization in which the server continuously pushes its screen activity to the client. Actual "screen scraping" of the display contents may be performed as a last resort. This model provided for effective performance early on, however the style of graphics programming has evolved over time which makes screen scraping less effective.

More applications now compose the contents of their windows internally, and simply transfer those contents into the frame buffer. For example, such applications may include various web browsers. For example, consider what happens when a user uses the scroll button to move a page on a display up or down. Early coding practice may have included simply copying the part of the page that remains on the screen to its new position, and then filling in new contents of the page that were exposed. This implementation may have been performed efficiently without consuming a large amount of bandwidth to send to updates to the client. However, in current programming practice it is likely that the entire contents of the region where the page is displayed will be updated by being overwritten. In general, since the contents have moved, substantially every pixel in the window changes and must be transmitted from the server to the client.

This condition generally means that it is may be worthwhile to attempt to detect when the update to the screen (i.e., on the client) is actually the result of a scroll operation (i.e., a significant portion of the screen is the same as the previous contents, but moved to a new location). It may be difficult from an efficiency perspective in moving a substantial number of pixels to the client when the contents of the screen have moved because the scroll offset may be one of a larger number of values. This brute force method is generally not satisfactory for determining the scroll offset if it is one of a larger number of values.

SUMMARY

In one embodiment an apparatus including a first computer for detecting a scrolling event is provided. The first computer is configured to store a destination array including pixels corresponding to a present set of data on a display of a second computer and to store a source array including pixels corresponding to an expected set of data to be provided on a display of the second computer after a scrolling event is performed. The first computer is configured to determine hash values of pixel pairs for the plurality of pixels of the destination array and to determine hash values of pixel pairs for the plurality of pixels at each pixel location of the source array. The first computer is configured to determine a final scroll offset between the pixels in the destination array and the pixels in the source array based on the hash values. The first computer is configured to transmit pixels indicative of the expected set of data to the second computer based on the final scroll offset such that the second computer provides the expected set of data on the display thereof when the scrolling event is performed.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIGS. 3A-3C depict an example of data being copied into a destination during a scroll operation in accordance to one embodiment; and FIG. 4 depicts a high level representation of the manner in which a final matrix is generated in view of the example as set forth in FIGS. 3A-3C.

DETAILED DESCRIPTION

Figure 1:
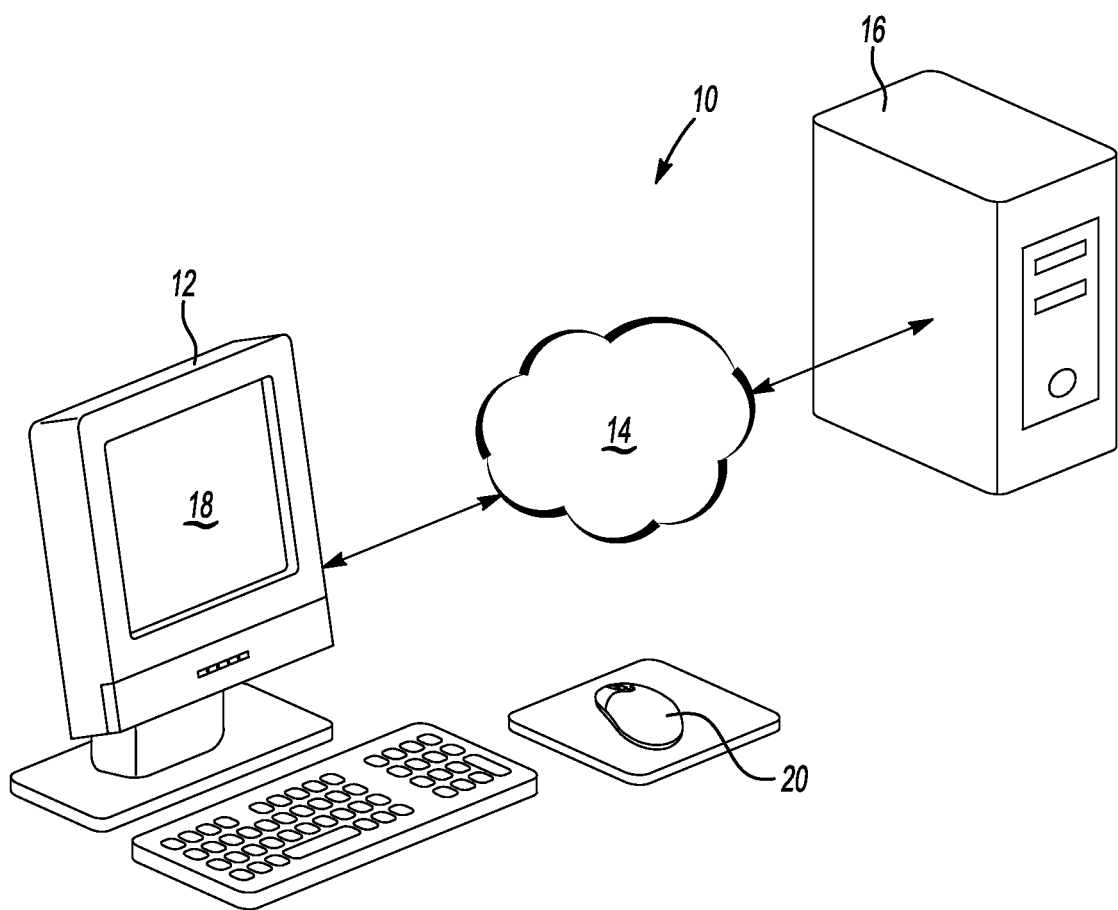
FIG. 1 depicts a system for detecting scrolling during a client display update in accordance to one embodiment.

Detailed embodiments of the present disclosure are disclosed herein; however, it is to be understood that the disclosed embodiments are merely exemplary and that they may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for variously employing the present embodiments.

The embodiments set forth herein generally provide at least one thin client (or client) and a server. All references to the various clients and the server and the functionality provided for each, are not intended to be limited to encompassing only what is illustrated and described herein. It is generally recognized that each client and server disclosed herein may include, but not limited to, any number of microprocessors, ICs, discrete analog devices, memory devices (e.g., FLASH, RAM, ROM, EPROM, EEPROM, or other suitable variants thereof), and software which co-act with one another to perform the various functions (or operations) as set forth below.

One conventional approach that compares each pixel in a region to the pixel at every possible offset during a scroll operation may be prohibitively expensive. Embodiments of the present disclosure may utilize compression and hashing values to reduce the scope of the possible offsets that are tried. For example, Lempel-Ziv (4) ("LZ77") compression may be used in relation to screen information that is sent from the server to the thin client. LZ77 compression uses a sliding window of previous data and provides its compression by replacing a string at the current location by a distance backwards into the sliding window and the length of the string.

When there is enough redundancy in the data to be compressed, such a condition may provide for an effective manner of compression.

An algorithm that employs LZ77 compression must be able to efficiently search backwards in a sliding window to find the longest string that matches the current location. To accomplish this, an LZ compressor uses a hashing algorithm that hashes pairs of pixels. The LZ compressor then traverses back through a hash chain to find previous occurrences of that pixel pair. Suppose that in the scroll detection case, all of the hash chains for old contents of an area that are about to be copied over are computed. Rather than using the hash chains to find previous occurrences of a sequence for compression purposes, it is contemplated that such hash chains may limit the possible offsets that are considered for comparison in determining if new contents are a scrolled version of the old contents. It is further contemplated that if the lengths of each chain is remembered (or stored), and the short chains are traversed, it is possible to further limit the number of possibly valid scroll offsets (e.g., the length of chain may be equal to 1).

For each offset tested, it is contemplated that a comparison can be made with the pixels forward to the end of the scan line, and backwards to the beginning A scroll offset may be stored or remembered if the comparison is successful and a count may be generated and stored to indicate the number of times the comparison is successful. Such a condition may be employed for every pixel pair in the new contents, and at the end, a selection of the pixel offset (if there is one) may be made with the highest count of successful line comparisons.

Once the candidate scroll offset has been selected, a full comparison of old and new contents that are offset by that amount may be completed to determine which set of pixels can be updated by sending a copy command to the client. Any pixels that cannot be copied by the copy (such as the newly exposed area) may then be sent. The implementation as disclosed herein may provide a bandwidth reduction by a factor of 10-20 when viewed in comparison to updating the entire area of the screen. The factor generally depends on the actual scroll offset.

FIG. 1 depicts a system 10 for detecting scrolling during a client display update in accordance to one embodiment. The apparatus 10 includes a first communication device (e.g., a client) 12, a network 14, and a second communication device (e.g., central computer or server) 16. The client 12 may be implemented as a thin client, which performs little to no local processing. The client 12 may depend on the server 16 to execute various applications that are required by a user. In one example, the client may be implemented as a Sun Ray® desk top unit and may communicate with the server 16 via the network 14 through the use of a User Datagram Protocol (UDP) network protocol. While FIG. 1 depicts a single client 12 it is recognized that the system 10 may include any number of clients 12 that are operably coupled to the server 16 via the network 14.

The client 12 includes a display 18 (or screen) for visually presenting data to the user. Data presented on the display 12 may be transmitted from the server 16 to the client 12. The client 12 includes a mouse (or other suitable device such as a scroll bar (or key) on a keyboard of the client 12) 20 for enabling the user to interact with an application executing on the server 16. The client 12 is configured to receive mouse or keyboard input that is sent as a request signal to the application on server 16. the application may interpret the input as a request to scroll the application display window on the client 12. When the application on server 16 updates the data that is to be displayed on the client 12, the server 16 determines which data can be copied from one place to another on the display 18 during the scroll operation, and transmits information indicative of the scrolled text (or information).

Figure 2A:
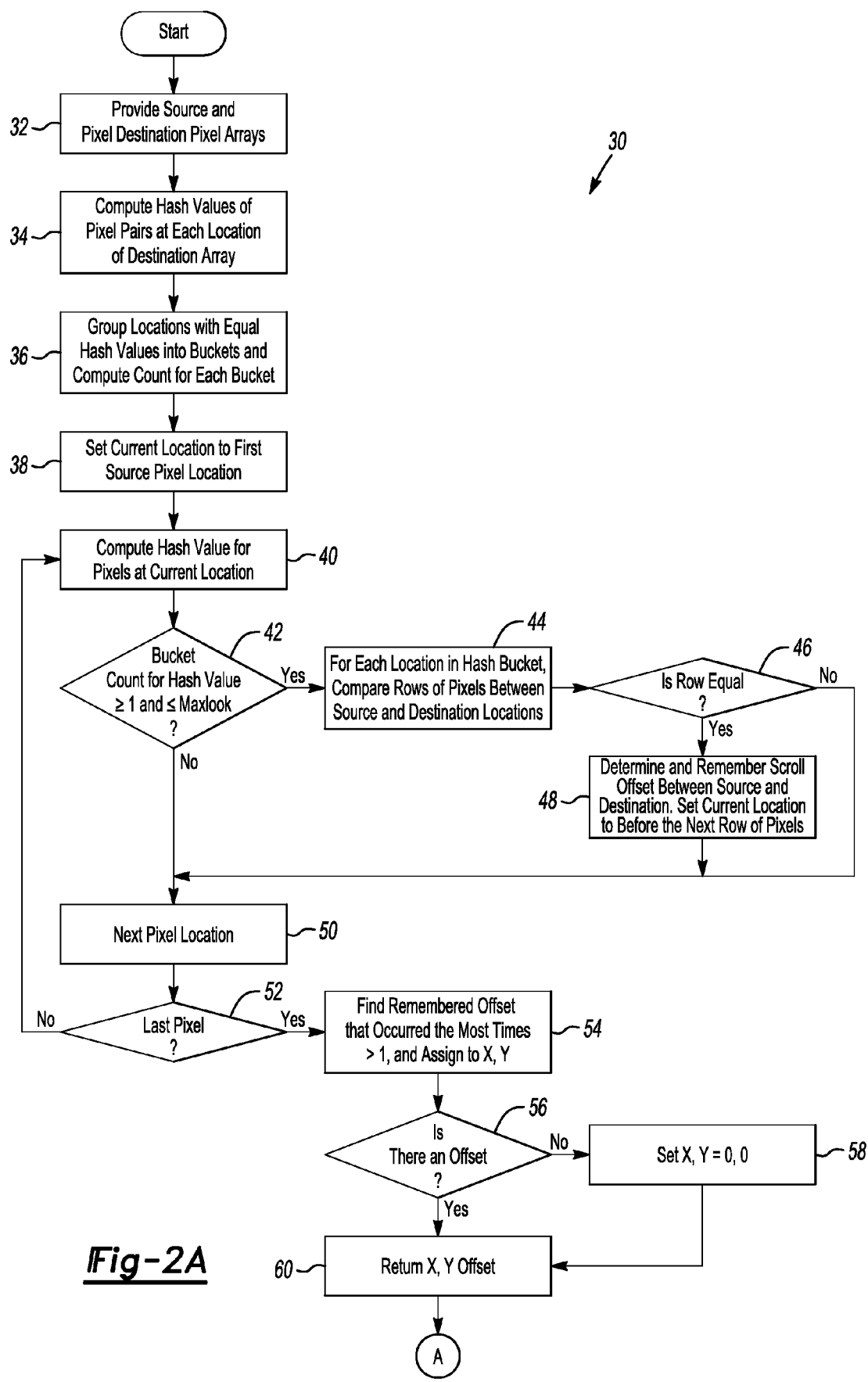
FIGS. 2A-2B depict a method for detecting scrolling during the client display update in accordance to one embodiment.
Figure 2B:
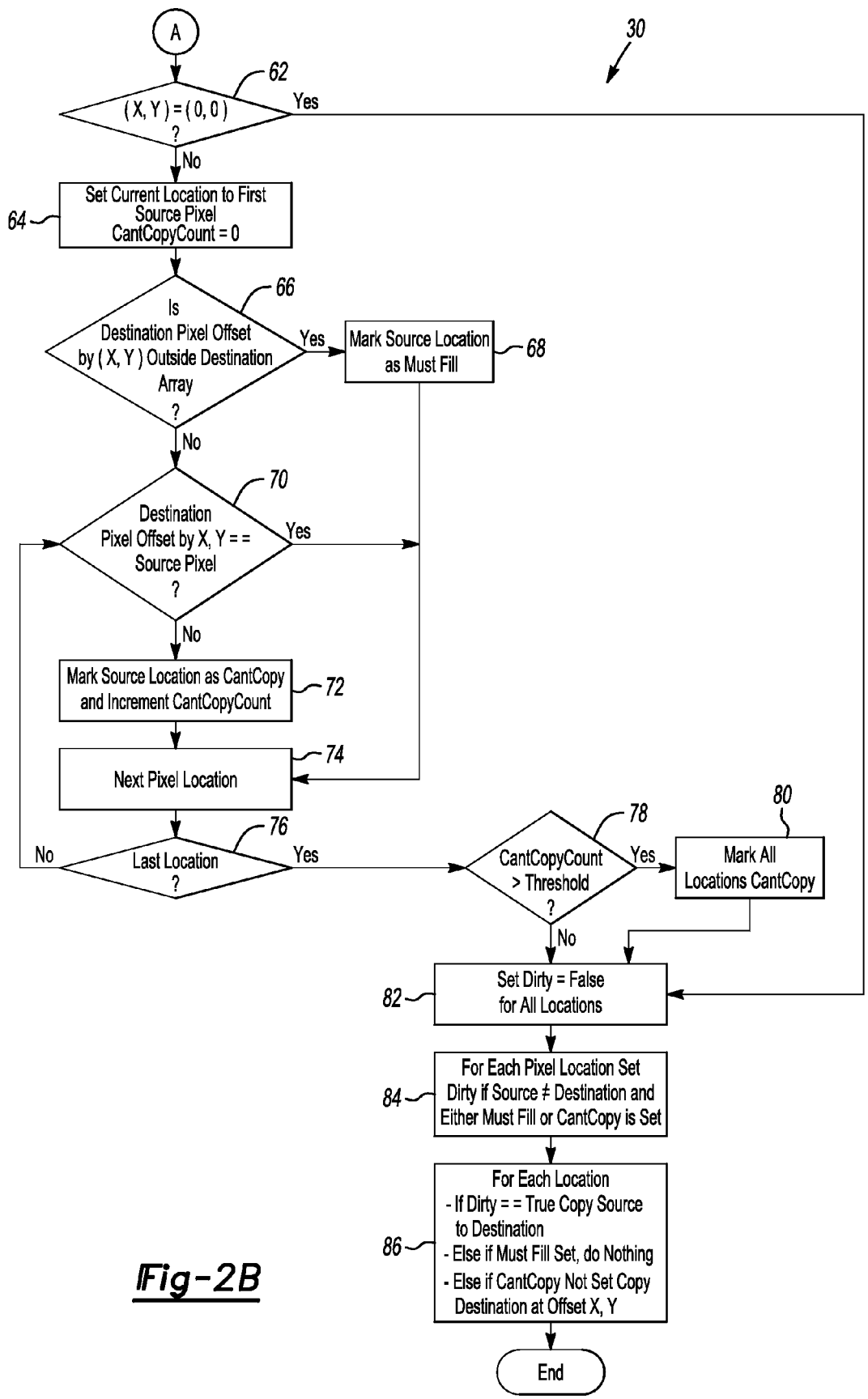

FIGS. 2A-2B depict a method 30 for detecting scrolling operation during the client display update in accordance to one embodiment. The particular order of the operations in the method 30, when executed, may be in any order and are not intended to be limited to only being performed sequentially. The order of the operations may be modified or varied based on the desired criteria of a particular implementation. The method 30 as set forth below describes the operations as executed by the server 16. FIGS. 3A-3C are provided for reference in connection with the operations of method 30.

In operation 32, the server 16 provides a destination array 180 and a source array 182, each comprising pixels indicative of data. The server 16 stores the destination array 180 and the source array 182 therein. An example of the destination array 180 and the source array 182 are shown in FIG. 3A. The destination array 180 and the source array 182 as depicted in FIG. 3A generally includes a column of pixel locations (e.g., 0, 1, 2, 3) and a row of pixel locations (e.g., 0, 1, 2, 3). The column and row of pixel locations form the array (x,y). In reference to the destination array 180, a pixel location of (1, 1) includes character "F" and a pixel location of (2, 1) includes character "J" and so on. In reference to the source array 182, a pixel location of (1, 1) includes character "A", a pixel location (2, 1) includes character "E" and so on. It is recognized that the characters in the destination array 180 and the source array 182 as shown in FIG. 3A are provided for illustration purposes and the data (or characters) and the size of the arrays 180, 182 may vary accordingly.

The pixels in the source array 182 generally correspond to data being written onto the screen 18 to update the screen 18 during a scroll operation. In other words, the server 16 provides the screen updates to the client(s) 12. The pixels in the destination array 180 generally correspond to the current contents of the visible screen 18 (e.g., previous to the scroll operation). Such data is also provided to the server 16. One aspect of this operation is that the pixels in the destination array 180 on the client 12 include similar pixel values as those in the source array 182 of the server 16. The data in the destination array 180 and the data in the source array 182 are not necessarily related. For example, if a user is in a browser and scrolls down the contents of an entire page, then the source array 182 generally comprises pixel data that make up the next page and there may not be overlapping pixel data between the destination array 180 and the source array 182. However, if the user selects the mouse 20 (or scroll button) to scroll down a single line, then an application (e.g., or web browser) determines that the source array 182 includes a large number of pixels data that are in common with the data in the current screen contents.

In general, the application itself creates the screen update from its own internal data without having to reference the current screen contents. This aspect provides the origin as to the need for the operations of the method 30. For example, a smart application may realize that it could copy its own the data currently on the screen 16 and then fill in the newly exposed areas on the screen 18. However, applications such as web browsers generally create the new contents of the screen 18 from scratch in a side buffer and then copy the entire contents onto the screen again. It is recognized that each client 12 also includes a destination array 180 as well. During a scrolling operation, the server 16 uses its copy of the destination array 180 and the source array 182 to determine which pixels can be updated by copying within the destination array 180 on the client 12, and which pixels of the source array 182 are to be transmitted from the server 16 to the client 12. Using this determination, the server 16 then sends the appropriate data such that the destination array 180 of the client 12 is then updated to be similar to that of the destination array 180 on the client 12. The method 30 reduces the amount of data that is passed over the network 14 from what would be sent by transmitting the entire contents of the source array 182.

In operation 34, the server 16 computes hash values of pixel pairs at each pixel location of the destination array 180. In general, the server 16 executes a hash algorithm on the pixels of the destination array 180 to provide the hash values. The hash algorithm (or hash function) is generally a mathematical function that converts or maps large data sets into smaller data sets. A hash value may comprise a single integer than may serve as an index to an array. An example of hash values of pixel pairs for each pixel location of the destination array 180 is generally shown at 184 in FIG. 3A. As shown in 184, each pixel location other that the last location on each row of pixels includes a corresponding hash value of that pixel plus the pixel immediately to its right.

In operation 36, the server 16 groups the pixel locations that have equal hash values into buckets and determines a count for each bucket. An example of the pixel grouping of hash values in relation to pixel locations and bucket count is generally shown at 188 in FIGS. 3A-3C. At 188, hash values are shown which range from 0-31. A count (or bucket count) is set for each hash value that is generated (or present) in the destination hash values as exhibited at 184. In addition, at 188, the pixel location for each corresponding hash value generated in 84 has a count that is equal to one is shown. It is recognized that there may be multiple hash values that are similar to one another. The example of FIG. 3A does not depict this condition; however, similar hash values may be generated in connection with operation 34. Similar hash values are generally indicative of similar characters (or objects) in the screen 18. At 188, the pixel locations (0, 0)-(3, 3) are shown along with their respective hash value and bucket count.

In operation 38, the server 16 sets a current pixel location to the first source pixel at location (0.0).

In operation 40, the server 16 computes the hash value for the pair of pixels at the current location.

In operation 42, the server 16 determines whether the hash bucket count as established for the destination array 180 (e.g., see operation 36 and 188 in FIGS. 3A, 3B) corresponding to the source hash value computed in operation 40 is within a particular range. The hash value is compared to determine if it is both greater than or equal to 1, and less than or equal to a maximum value MAXLOOK. In one example, MAXLOOK is equal to 1. It is recognized that MAXLOOK may be equal to any value. It is also recognized that if MAXLOOK were selected to be a value greater than 1, then there may be greater resolution in terms of determining the pixel offset during a scrolling event; however, complexity and processing time may increase. As shown in 188, the bucket count for each pixel is provided. If bucket count=1 for the hash value from operation 40, then the method 30 moves to operation 44. If the bucket count is 0, or a value greater than 1, then the method 30 moves to operation 50.

In operation 44, for each pixel location having a hash bucket that meets the condition of operation 42, the server 16 compares rows of pixels between the source array 182 and the destination array 180. For example, the server 16 has determined that the hash value of 5 computed at pixel location (2, 1) (see 189 of FIG. 3B) of the source array 182 has a bucket count of 1 (see 188 of FIG. 3A for value 5). The single location in the hash bucket list for the destination array 180 is shown to be (1, 0) (see 188 of FIG. 3A). Accordingly, the server 16 compares the contents of the row of pixels containing location (2, 1) (e.g., "ABC") of the source array 182 to the contents of the row of pixels containing (1, 0) (e.g., "*BC") of the destination array 180 to determine if there is a match. In this case, there is no match, and so method 30 proceeds to operation 50. (See 77-78 of FIG. 3B). Similarly, the hash value of 5 is seen again at source location (0, 2) and so the source row containing (0, 2) (e.g., "EF") is compared to the pixels in the destination row containing (1, 0) (e.g., "BCD"). Once again, there is no match, and so method 30 proceeds to operation 50. (See 80-81 of FIG. 3B). Further the server 16 has determined that the hash value of 11 computed at the pixel location (1, 2) (see 189 of FIG. 3B) of the source array 182 satisfies the condition of operation 42. The single location in the hash list for the destination array 180 is shown to be (0, 1) (see 188 of FIG. 3A).

Accordingly, the server 16 compares the contents of the row of pixels starting at location (1, 2) (e.g., "EFG") of the source array 182 to the contents of row of pixels starting at location (0, 1) (e.g., "EFG") to determine if there is a match and to determine the corresponding scroll offset between the pixel location (1, 2) of the source array 182 and the pixel location (0, 1) of the destination array 180. Such a condition is generally shown at 190 of FIG. 3B.

Further, the server 16 has determined that the hash value of 19 computed at pixel location (1, 3) (see 189 of FIG. 3B) also has a bucket count of 1 (see 189 of FIG. 3B for value 19). The single location in the hash bucket locations for the destination array 180 is shown to be (0, 2) (see 188 of FIG. 3A).

Accordingly, the server 16 compares the contents of the row of pixels starting at location (1, 3) (e.g., "IJK") of the source array 182 to the contents of row of pixels starting at location (0, 2) (e.g., "IJK") of the destination array 180 to determine if there is a match and the corresponding offset between the pixel location (1, 3) of the source array 182 and the pixel location (0, 2) of the destination array 180. Such a condition is generally shown at 192 of FIG. 3B.

In operation 46, the server 16 determines whether the pixels of the rows compared in operation 44 are the same. For example, at 190 of FIG. 3B, the client 12 determines whether the pixels of the source array 182 starting at row 2, columns 0-2 (e.g., "EFG") are similar to the pixels of the destination array 180 starting at row 0, columns 0-2 (e.g., "EFG"). In this case, the pixels of the source array 182 starting at row 2, columns 1-3 are the same as the pixels of the destination array 180 starting at row 0, columns 1-3 and the method 30 moves to operation 48. If there is a non-zero column offset between the source and destination locations, the number of pixels compared will not consist of the entire row, but only those pixels that are within the bounds of the source and destination arrays. For example, this comparison compares "EFG" against "EFG", rather than the entire rows "EFG" against "EFGH".

In a similar manner, the server 16 determines whether the pixels of the source array 182 starting at row 3, columns 1-3 (e.g., "IJK") are similar to the pixels of the destination array 180 starting at row 2, columns 0-2 (e.g., "IJK"). In this case, the pixels of the source array 182 starting at row 3, columns 1-3 are the same as the pixels of the destination array 180 starting at row 2, columns 0-2 and the method 30 moves to operation 48.

In operation 48, the server 16 determines the pixel offset between the pixel location of the source array 182 and the pixel location of the destination array 180 that provided pixels that are the same as one another. For example, the server 16 determines that there was a scroll offset of (1, 1) between the pixel location (1, 2) of the source array 182 and pixel location (0, 1) of the destination array 180 for the hash value of 11 and the pixels EFG (see 190 of FIG. 3B). Likewise, the server 16 determines that there was a scroll offset of (1, 1) between the pixel location of (1, 3) of the source array 182 and the pixel location (0, 2) of the destination array 180 for the hash value of 19 and the pixels "IJK" (see 192 of FIG. 3B).

In both cases, the scroll offset is (1,1). The offset for the first case (e.g., 190 as shown in FIG. 3B) is determined by subtracting the pixel location (1, 0) of the destination array 180 from the pixel location (2, 1) of the source array 182. Accordingly, the offset for the first case is (1, 1). The offset for the second case (e.g., 192 as shown in FIG. 3B) is determined by subtracting the pixel location (0, 2) of the destination array 180 from the pixel location (1, 3) of the source array 182. Accordingly, the offset for the second case is (1, 1). The client 12 stores each calculated offset.

In operation 50, the server 16 moves Current Location to the next pixel location in the source array 182.

In operation 52, the server 16 determines whether the pixel in the source array 182 is the last pixel therein. If so, then the method 30 moves to operation 54. If not, then the method 30 moves to operation 40.

In operation 54, the server 16 searches for the scroll offset that occurred the most number of times. If that scroll offset occurred more than once, then assign this scroll offset to X,Y.

In operation 56, the server 16 determines if a scroll offset was assigned to X,Y in operation 54. If so, then the method 30 moves to operation 60. If not, then the method 30 moves to operation 58.

In operation 58, the server 16 sets the value of X, Y to (0, 0)).

In operation 60, the server 16 returns the value of X, Y (see 194 at FIG. 3B).

In operation 62, the server 16 determines if the scroll offset (X, Y) is equal to (0, 0). If this condition is true, then the method 30 moves to 82. If not, then the method 30 moves to operation 64.

In operation 64, the server 16 sets Current Location to the first pixel position in the source array 182 and sets variable, CantCopyCount to zero.

In operation 66, the server 16 determines whether the pixel in the destination array 180 that is offset from the Current Location by the scroll offset (X, Y) is outside of the destination array 180. If this condition is true, then the method 30 moves to operation 68. If not, then the method 30 moves to operation 70.

In operation 68, the server 16 marks the pixel location as a "MustFill."

In operation 70, the server 16 determines whether the contents of the pixel locations of the source array 182, when offset by the scroll offset match the contents of the pixel locations of the destination array 180. If this condition is true, then the method 30 moves to operation 74. This condition is indicative of the server 16 being able to copy the contents of the pixel location of the destination array 180. In other words, the contents of the pixel location of the destination array 30 may be copied over in response to a scrolling operation.

In operation 72, the server 16 marks the pixel location at the source array 182 as a variable, CantCopy and increments the CantCopyCount.

In operation 74, the server 16 moves on to the next pixel location in the source array 182.

Operations 66, 68, 70 and 72 will be discussed in more detail below.

In operation 76, the server 16 determines whether the next pixel location in the source array 182 is the last pixel location. If so, then the method 30 moves to operation 78. If not, then the method 30 moves to operation 70.

A first matrix (or array) 198 as shown in FIG. 3C (and computed by the server 16) illustrates which of the pixel locations correspond to a "C" (or can copy), "M" (or MustFill), "N" (or no copy). The first matrix 198 is used to determine which locations can be copied, left as is, or must be sent.

In operation 78, the server 16 determines if CantCopyCount is greater than a predetermined threshold (e.g. 50%). If this condition is true, then the method 30 moves to operation 80. If not, then the method 30 moves to operation 82.

In operation 80, the server 16 marks all locations of the first matrix 198 as N (or cant copy). If the client 12 determines that CantCopyCount exceeds the threshold, then such a condition is generally indicative there a large number of elements that cannot be copied and it may be preferable to employ a different method during the scrolling event.

In general, operations 66, 68, 70 and 72 are performed to determine how much (or which pixels) can be copied from the destination array 180. The test to determine how many pixels can be copied from the destination array 180 during a scroll event is to determine if the pixel in the source array 182 is the same as the pixel in the destination array 180 at the given scroll offset. That is, with the scroll offset of (1, 1) (as determined in connection with operation 48), a comparison is made with the pixel locations (i, j) in the source array 182 against the pixel locations (i−1, j−1) in the destination array 180 (see operations 70). In general, this should be done without going outside of the boundary of the destination array 180. Any pixel location that goes outside of the destination array 180 boundary is marked with a "Mustfill" (see operations 66 and 68).

For example, at 196 (as shown in FIG. 3B), the server 16 cannot compare the pixel locations (i, 0) of the source array 182 with the pixel locations (i−1, j−1) of the destination array 180. As such, all of the pixel locations of row 0 in the first matrix 198 are marked as MustFill (or "M"). Similarly, for rows 1-3 a comparison cannot be made for the pixel locations (0, j) of the source array 182 against the pixel locations (−1, j−1) of the destination array 180. As such, column 0 of rows 1-3 of the first matrix 198 are marked as M. For a large number of the elements in the first matrix 198, such elements may be possible to copy ("C") since the contents of the pixel locations of the source array 182 are equal to the contents of the pixel locations of the destination array at the scroll offset of (1, 1). This condition is generally shown at 200 in FIG. 3B. The first matrix 198 includes a "cant copy" or "no copy" (or "N") which indicates that this element cannot be copied. For example, N as shown in the first matrix 198 corresponds to the pixel "*" in the destination array 180 and where the pixel "A" is generated in the source array 182 under the pixel "*". In general, the method 30 maintains a record of the number of pixels (or elements) that cannot be copied by increasing CantCopyCount (see operation 72). See 202 in FIG. 3B where CantCopyCount is set to 1 out of 9 entries. In this case it is possible to copy elements (or pixels) from the destination array 180. This condition indicates that a portion of the original contents in the screen 18 will still be present in the screen 18 after the scroll event.

Operations 82, 84, and 86 as described below are performed without the scroll offset (x,y) in order to determine how to update the elements that cannot be copied (i.e., those that have "N" or "M" in the first matrix 198).

In operation 82, the server 16 sets variable "DIRTY" to false for all locations in the elements in the source array 182.

In operation 84, the server 16 sets DIRTY to true for each pixel location in the source array 182 that is not equal to the corresponding destination pixel in the destination array 180 and also has the corresponding MustFill or CantCopy set in the first matrix 198.

In operation 86, the server 16 (i) for each location in the first matrix 198, copies the pixel (or element) from each pixel location in the source array 182 that is set to DIRTY to a final matrix 208 (see FIG. 3C); (ii) does not perform an action if the location is marked with a Mustfill; and (iii) copies the element from the destination array 180 at the scroll offset (X, Y) if the element is not a CantCopy.

The final result of operations 82, 84, and 86 are shown as the final array 208 (see FIG. 3C), and also as array 302 (in FIG. 4). These final results assigned to the destination array 180 will be identical to the source array 182. The changes result from a sequence of destination to destination copy operations (i.e., contents are copied from destination array of server 16 to the destination array of the client 12) (see array 300 in FIG. 4) and source to destination copy operations (i.e., contents are copied from source array of server 16 to destination array of client 12) where required (see array 302).

In connection with operations 82, 84, and 86, the server 16 is configured to compare the pixel locations of the source array 182 to the pixel location of the destination array 180 without the scroll offset (X, Y). Any of the elements in the first matrix 198 that have a "C" are ignored at this stage, and the server 16 deals only with the elements in the first matrix 198 that have a Mustfill ("M") or CantCopy ("C"). The results of the comparison are shown at 204 of FIG. 3C. For example, at 204 of FIG. 3C. For example, at operation 84, the server 16 compare compares the elements of corresponding rows and corresponding columns of the destination array 180 to the corresponding rows and the corresponding columns of the source array 182. When the comparison shows that the pixels are unequal, the server 16 sets each corresponding element in the array 204 to Dirty ("D"). When the comparison shows that the pixels are equal, the server 16 sets each corresponding element in the array 204 to Equal ("E"). Any Dirty entries generally indicate that the elements in those corresponding pixel locations have to be copied from the source array 182 and sent over the network 14 to the destination array 180 on the client 12, as shown in the final matrix 208 (see "D" in the matrix 204). Items marked "E" need not be copied at all, because the contents of the source array 182 and the destination array 180 at those locations are already the same pixel value. Items marked "C", as generally shown at 204 in FIG. 3C, correspond to the respective items that were marked as "C" as shown in FIG. 3B, and are copied from the destination array 180 on client 12 to itself.

The apparatus 10 and method 30 as depicted above provides a cost savings in view of conventional implementations. In the case of a thin client, the destination array 180 exists across a network connection within the client 12, while the source array 182 exists within the server 16. The server 16 also retains a copy of the destination array 180 so that it can do the various comparisons required by the method 30. However, one object of the method 30 is to update the destination array 180 on the client 12, which is displayed on the display 18, while transmitting the minimum amount of information across the network 14 between the server 16 and the client 12. Cost in this system may be proportional to the amount of data that has to be sent from the server 16 to the client 12. Destination to destination copies within the array 180 that usually require only a small amount of information to copy a large number of pixels are thus much lower cost than sending the entire source array 182 across the network 14. For example, it may be possible to send a 16 byte command to copy thousands of pixels from the server 16 to the screen 18 of a particular client 12. Whereas, the cost to send the entire array of pixels may be 16+3*P bytes, where P is the number of 24-bit pixels sent. Using our example in FIGS. 3A-3C, from a cost perspective, it can be assumed that a destination to destination copy within the destination array 180 (see items marked "C" in the matrix 204) may be 10 times faster than a copy from the source array 182 to the destination array 180 (see items marked "D" in the matrix 204). At 212 of FIG. 3C, it can be seen that the overall cost with implementing system 10 and the method 30 is generally shown at 78. With this implementation, a cost savings of 52% may be realized as opposed to a conventional implementation.

The difference in cost between a source to destination copy and a destination copy may be sensitive to the characteristics of the source array 182 and the destination array 180. In general, all of the "C" entries in the array 204 may be combined into one copy operation, or a handful of copy operations, while source to destination copies are generally proportional to the number of pixels that are being copied. As such, the overall cost of the copy operations are generally small or next to nothing. The relative cost of utilizing the system 10 and the method 30 may be approximately the ratio of the pixels copied from the source array 182 to the destination array 180 (see the values marked "D" in the array 204) over the total number of pixels in the arrays. For example, scrolling a window with 25 lines of text up one line may result in a destination to destination copy of all but one line of text, followed by a source to destination copy of one line of text. The relative cost of this versus updating the whole window is $\frac{1}{25}$, or 4%, thus representing a savings of 96%.

FIG. 4 depicts a high level representation of the manner in which the final matrix 208 is generated in view of the example set forth in FIGS. 3A-3C. At 300, during a scrolling operation, pixels B, C, E, F, G, I, J, and K are copied over. Also, at 300, each pixel being by a circle corresponds to a pixel location that will include a pixel that is copied over from the source array 182. The pixel enclosed in a diamond corresponds to a pixel that will not change during the scrolling event. At 302, the final matrix 208 is shown which depicts that blanks are copied from the source array 182 into respective pixel locations thereof and also that the pixel "A" is copied from its corresponding pixel location in the source array 182. Pixels "B, C, E, F, G, I, J, and K" are copied from the destination array 180 to itself.

In general, the arrays characterizing what is needed to update pixels (e.g., see lines 120-123 and 154-157 in FIG. 3C) may not be constructed based on individual pixels within the source and destination arrays. Rather, small square tiles (32× 32, typically) of pixels are grouped together, and the "E/D/C" values are computed for each tile, rather than each individual pixel. This may lower the processing overhead and management of the graphics operations for copying within the destination array, and sending pixels from the source to the destination.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for detecting a scrolling event and for updating a display, the apparatus comprising:

a first computer for communicating with a second computer over a network, the first computer being configured to:
  store a destination array including a plurality of pixels corresponding to a present set of data on a display of the second computer, the destination array including a plurality of rows and a pixel location for each pixel;
  store a source array including a plurality of pixels corresponding to an expected set of data to be provided on the display of the second computer after a scrolling event is performed at the second computer, the source array including a plurality of rows and a pixel location for each pixel;
  determine hash values of pixel pairs for the plurality of pixels at each pixel location of the destination array;
  determine hash values of pixel pairs for the plurality of pixels at each pixel location of the source array;
  determine a final scroll offset between the pixels in the destination array and the pixels in the source array based on the hash values of the pixel pairs for the destination array and on the hash values of the pixel pairs for the source array;
  transmit pixels indicative of the expected set of data to the second computer based on the final scroll offset such that the second computer provides the expected set of data on the display thereof when the scrolling event is performed;
  group the pixel locations with equal hash values of the destination array into buckets;
  generate a count for each bucket prior to determining the final scroll offset;
  determine whether the count for each bucket is equal to or greater than a first predetermined value and is equal to or less than a second predetermined value; and
  compare, for each count that is equal to or greater than the first predetermined value and that is equal to or less than the second predetermined value, rows of the source array to rows of the destination array to determine if one or more of the rows of the source array are equal to one or more of the rows of the destination array,
  wherein the second predetermined value corresponds to a resolution in terms of determining the pixel offset during the scrolling event.

2. The apparatus of claim 1 wherein the first computer is further configured to store a first scroll offset for each of the one or more rows of the source array that are equal to each of the one or more of the rows of the destination array.

3. The apparatus of claim 2 wherein the first computer is further configured to determine which first scroll offset occurred a maximum number of times for each of the one or more rows of the source array that are equal to each of the one or more of the rows of the destination array.

4. The apparatus of claim 3 wherein the first computer is further configured to assign the first scroll offset that occurred the maximum number of times as the final scroll offset.

5. The apparatus of claim 1 wherein the first computer is a server and the second computer is a thin client.

6. The apparatus of claim 1 wherein the first computer is further configured to transmit pixels indicative of the expected set of data over the network to a destination array of the second computer based on the final scroll offset, the destination array of the second computer providing the expected set of data on the display after the scrolling event is performed.

7. The apparatus of claim 1 wherein the second predetermined value is greater than one to increase resolution during the scrolling event.

8. A method for detecting a scrolling event and for updating a display, the method comprising:
  transmitting information from a first computer to a second computer over a network,
  storing, at the first computer, a destination array including a plurality of pixels corresponding to a present set of data on a display of the second computer, the destination array including a plurality of rows and a pixel location for each pixel;
  storing, at the first computer, a source array including a plurality of pixels corresponding to an expected set of data to be provided on the display of the second computer after a scrolling event is performed at the second computer, the source array including a plurality of rows and a pixel location for each pixel;
  determining hash values of pixel pairs for the plurality of pixels at each pixel location of the destination array;
  determining hash values of pixel pairs for the plurality of pixels at each pixel location of the source array;
  determining a final scroll offset between the pixels in the destination array and the pixels in the source array based on the hash values of the pixel pairs for the destination array and on the hash values of the pixel pairs for the source array;
  transmitting, from the first computer, pixels indicative of the expected set of data to the second computer based on the final scroll offset such that the second computer provides the expected set of data on the display thereof when the scrolling event is performed;
  grouping the pixel locations with equal hash values of the destination array into buckets generating a count for each bucket prior to determining the scroll offset;
  determining whether the count for each bucket is equal to or greater than a first predetermined value and is equal to or less than a second predetermined value; and
  comparing, for each count that is equal to or greater than the first predetermined value and that is equal to or less than the second predetermined value, rows of the source array to rows of the destination array to determine if one or more of the rows of the source array are equal to one or more of the rows of the destination array,
  wherein the second predetermined value corresponds to a resolution in terms of determining the pixel offset during the scrolling event.

9. The method of claim 8 further comprising storing a first scroll offset for each of the one or more rows of the source array that are equal to each of the one or more of the rows of the destination array.

10. The method of claim 9 further comprising determining which first scroll offset occurred a maximum number of times for each of the one or more rows of the source array that are equal to each of the one or more of the rows of the destination array.

11. The method of claim 10 further comprising assigning the first scroll offset that occurred the maximum number of times as the final scroll offset.

12. The method of claim 8 wherein the first computer is a server and the second computer is a thin client.

13. The method of claim 8 further comprising transmitting, from the first computer, pixels indicative of the expected set of data over the network to a destination array of the second computer based on the final scroll offset, the destination array of the second computer providing the expected set of data on the display after the scrolling event is performed.

14. The method of claim 8 wherein the second predetermined value is greater than one to increase resolution during the scrolling event.

15. An apparatus for updating a display based on a scrolling event, the apparatus comprising:

a first computer configured to receive pixels indicative of an expected set of data from a second computer that are based on a final scroll offset for providing the expected set of data on a display thereof when a scrolling event is performed, the second computer being configured to (i) store a destination array including a plurality of pixels corresponding to a present set of data on a display of the second computer, the destination array including a plurality of rows and a pixel location for each pixel, (ii) store a source array including a plurality of pixels corresponding to an expected set of data to be provided on the display of the second computer after a scrolling event is performed at the second computer, the source array including a plurality of rows and a pixel location for each pixel, (iii) determine hash values of pixel pairs for the plurality of pixels at each pixel location of the destination array, (iv) determine hash values of pixel pairs for the plurality of pixels at each pixel location of the source array, (v) determine the final scroll offset between the pixels in the destination array and the pixels in the source array based on the hash values of the pixel pairs for the destination array and on the hash values of the pixel pairs for the source array, (vi) group the pixel locations with equal hash values of the destination array into buckets, (vii) generate a count for each bucket prior to determining the scroll offset, (viii) determine whether the count for each bucket is equal to or greater than a first predetermined value and is equal to or less than a second predetermined value, and (ix) compare, for each count that is equal to or greater than the first predetermined value and that is equal to or less than the second predetermined value, rows of the source array to rows of the destination array to determine if one or more of the rows of the source array are equal to one or more rows of the destination array, wherein the second predetermined value corresponds to a resolution in terms of determining the pixel offset during the scrolling event.

16. The apparatus of claim 15 wherein the first computer includes a thin client having a destination array, the thin client being configured to receive the pixels indicative of the expected set of data over a network in the destination array thereof based on the final scroll offset and to provide the expected set of data on the display after the scrolling event is performed.

17. The apparatus of claim 15 wherein the second predetermined value is greater than one to increase resolution during the scrolling event.

* * * * *